United States Patent
Colnot

(10) Patent No.: US 9,495,524 B2
(45) Date of Patent: Nov. 15, 2016

(54) SECURE USER AUTHENTICATION USING A MASTER SECURE ELEMENT

(71) Applicant: NXP B.V., Eindhoven (NL)

(72) Inventor: Cedric Colnot, Leuven (BE)

(73) Assignee: NXP B.V., Eindhoven (NL)

( * ) Notice: Subject to any disclaimer, the term of this patent is extended or adjusted under 35 U.S.C. 154(b) by 130 days.

(21) Appl. No.: 13/632,870

(22) Filed: Oct. 1, 2012

(65) Prior Publication Data

US 2014/0096222 A1    Apr. 3, 2014

(51) Int. Cl.
| | |
|---|---|
| *G06F 21/31* | (2013.01) |
| *G06F 21/74* | (2013.01) |
| *G06F 21/83* | (2013.01) |
| *G06F 21/40* | (2013.01) |
| *G06F 21/77* | (2013.01) |
| *H04W 4/00* | (2009.01) |
| *H04W 12/06* | (2009.01) |

(52) U.S. Cl.
CPC ............. *G06F 21/31* (2013.01); *G06F 21/40* (2013.01); *G06F 21/74* (2013.01); *G06F 21/77* (2013.01); *G06F 21/83* (2013.01); *H04W 4/008* (2013.01); *H04W 12/06* (2013.01)

(58) Field of Classification Search
CPC ...................................................... G06F 21/31
USPC ............................. 726/34–35; 713/182, 189
See application file for complete search history.

(56) References Cited

U.S. PATENT DOCUMENTS

| | | | |
|---|---|---|---|
| 5,280,592 A * | 1/1994 | Ryba | G06F 9/3834 710/200 |
| 5,339,417 A * | 8/1994 | Connell | G06F 9/45558 712/244 |
| 5,724,424 A | 3/1998 | Gifford | |
| 6,092,202 A | 7/2000 | Veil et al. | |
| 6,976,090 B2 * | 12/2005 | Ben-Shaul | G06F 17/3089 707/E17.116 |
| 8,052,049 B1 * | 11/2011 | Doland et al. | 235/379 |
| 8,707,056 B2 | 4/2014 | Felton | |
| 2002/0010798 A1 * | 1/2002 | Ben-Shaul | G06F 17/3089 709/247 |
| 2002/0029342 A1 | 3/2002 | Keech | |
| 2003/0079127 A1 | 4/2003 | Bidan et al. | |

(Continued)

FOREIGN PATENT DOCUMENTS

| | | |
|---|---|---|
| CN | 1302406 A | 7/2001 |
| CN | 1561508 A | 1/2005 |

(Continued)

OTHER PUBLICATIONS

Yang et al.; Secure Scan: A Design-for-Test Architecture for Crypto Chips; Published in: IEEE Transactions on Computer-Aided Design of Integrated Circuits and Systems (vol. 25 , Issue: 10 ); pp. 2287-2293; Date of Publication : Oct. 2006; IEEE Xplore.*

(Continued)

*Primary Examiner* — Bradley Holder

(57) ABSTRACT

The master secure element comprises a processor, a memory and a logic unit and at least controls the user input of the handset in order to secure the user authentication based on PIN entry. The PIN code is entered directly into the secure element with no possibility for the host processor to intercept the code or for a malware program to inject the code into the master secure element.

22 Claims, 5 Drawing Sheets

(56) References Cited

U.S. PATENT DOCUMENTS

| | | | |
|---|---|---|---|
| 2003/0114152 A1* | 6/2003 | Gibbs | G06F 1/3209 455/419 |
| 2004/0192434 A1* | 9/2004 | Walker | G06Q 40/025 463/25 |
| 2005/0182952 A1* | 8/2005 | Shinozaki | 713/189 |
| 2005/0278544 A1* | 12/2005 | Baxter | G06F 17/30902 713/182 |
| 2006/0136717 A1* | 6/2006 | Buer et al. | 713/155 |
| 2006/0287963 A1 | 12/2006 | Steeves et al. | |
| 2007/0069008 A1 | 3/2007 | Klein et al. | |
| 2008/0209212 A1 | 8/2008 | Ditzman et al. | |
| 2009/0144558 A1* | 6/2009 | Wang | G06F 21/83 713/189 |
| 2009/0307139 A1 | 12/2009 | Mardikar et al. | |
| 2010/0107238 A1* | 4/2010 | Stedman et al. | 726/13 |
| 2011/0119141 A1 | 5/2011 | Hoyos et al. | |
| 2011/0240728 A9* | 10/2011 | Arnouse | 235/375 |
| 2011/0251954 A1 | 10/2011 | Chin | |
| 2012/0178366 A1 | 7/2012 | Levy et al. | |
| 2014/0040147 A1 | 2/2014 | Varadarajan et al. | |
| 2014/0095387 A1 | 4/2014 | Colnot | |
| 2014/0095388 A1 | 4/2014 | Colnot | |
| 2015/0056957 A1 | 2/2015 | Mardikar et al. | |

FOREIGN PATENT DOCUMENTS

| | | |
|---|---|---|
| CN | 101840548 A | 9/2010 |
| CN | 102057386 A | 5/2011 |
| CN | 102143482 A | 8/2011 |
| CN | 102567662 A | 7/2012 |
| FR | 2 814 880 A1 | 4/2002 |
| WO | 01/17310 A1 | 3/2001 |
| WO | 2007/129345 A1 | 11/2007 |
| WO | 2010002541 A1 | 1/2010 |
| WO | 2011/051757 A1 | 5/2011 |

OTHER PUBLICATIONS

Gorbet et al.; Triangles: design of a physical/digital construction kit; Published in: Proceeding DIS '97 Proceedings of the 2nd conference on Designing interactive systems: processes, practices, methods, and techniques; pp. 125-128; 1997; ACM Digital Library.*

"Delivering Enhanced Security at a Lower Cost to the Mobile Market", GlobalPlatform, 26 pgs, retrieved from the Internet at: http://www.globalplatform.org/mediawhitepapers.asp (Feb. 2011).

European Patent Office, Extended European Search Report, EP Application 13186761.6, Dec. 16, 2013.

* cited by examiner

SECURE USER AUTHENTICATION USING A MASTER SECURE ELEMENT

Related application "Validating a Transaction with a Secure Input and a Non-Secure Output", Ser. No. 13/632,907 filed on the same day and assigned to the same assignee is incorporated by reference herein in its entirety.

Related application "Validating a Transaction with a Secure Input without Requiring PIN Code Entry", Ser. No. 13/632,932 filed on the same day and assigned to the same assignee is incorporated by reference herein in its entirety.

BACKGROUND

Mobile platforms or connected devices such as smart phones, personal computers, tablet PCs and smart meters are integrating a secure element to authenticate the platform, to protect user credentials or to secure transactions. The secure element is typically a highly tamper resistant device that provides a secure execution environment isolated from the host processor. The secure element may be integrated into various form factors such as, for example, SIM cards, SD cards, or small outline packages attached directly on the printed circuit board (embedded secure element).

The activation of the functionalities of a device or validation of an operation involving the device typically requires authentication of the user by the secure element. Typically, the user enters a PIN directly on a touch screen or a keypad of the device. The entered PIN is communicated to the secure element via the host processor which resides in an open, nonsecure environment. Because user's devices are typically connected to one or more network, the devices can be infected by malware capable of intercepting the user's PIN.

The secure element is integrated into, for example, a mobile handset or PC that is controlled by the host processor. The secure element is typically a slave device that cannot distinguish between a PIN entered by the user or by malware. In both instances, the secure element receives the same command from the host processor. In the typical mobile handset architecture, the PIN is entered either on a physical keypad or on a virtual keypad of a touch screen. The user input is always under the control of the host processor which creates security vulnerabilities. Typical solutions to the vulnerabilities are software solutions, that may or may not be enforced by hardware features that attempt to isolate the PIN entry process, including the keypad and or display drivers, from other processes that run on the host processor. The various techniques of process isolation or virtualization create a secure environment that is typically not tamper resistant and also typically increases the complexity of the required software architecture. One implementation of such a technique is the TEE proposed by GlobalPlatform TEE White Paper, February 2011 and incorporated herein by reference in its entirety which states in part:

> The TEE is a separate execution environment that runs alongside the Rich OS and provides security services to that rich environment. The TEE offers an execution space that provides a higher level of security than a Rich OS; though not as secure as a Secure Element (SE), the security offered by the TEE is sufficient for most applications. In this way, the TEE delivers a balance allowing for greater security than a Rich OS environment with considerably lower cost than an SE.

Prior art connected device architecture 100 (e.g. mobile handset architecture) is shown in FIG. 1. Display 110 and keypad 120 (keypad 120 may be a physical or virtual keypad) are connected to host processor 130 along with Secure Element (SE) 150 and Subscriber Identity Module (SIM) 140. SIM 140 is a secure element that typically contains the international mobile subscriber identity (IMSI) and the related key used to authenticate subscribers on mobile networks. SE 150 and SIM 140 securely store applications such as a mobile wallet application. SE 150 and SIM 140 activation is protected with two passwords: a personal identification number (PIN) for ordinary use and a personal unblocking code (PUK) for PIN unlocking. When the PIN is requested by SE 150 or SIM 140, host processor 130 can inform the user that it is running in secure mode by displaying a security indicator that, for example, was preselected by the user such as mother's maiden name or a selected photo thumbnail. While the security indicator provides a valuable indication to the user, it does not guarantee that the PIN received by SE 150 has been entered by the user.

DETAILED DESCRIPTION

Figure 1:
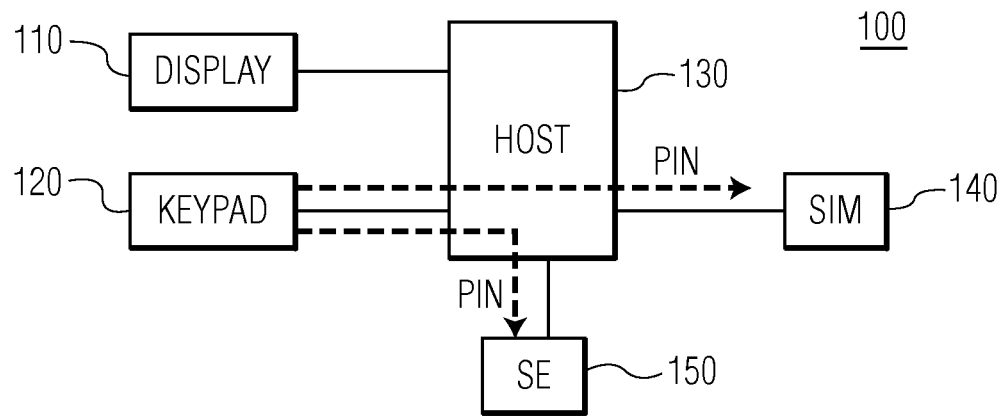
FIG. 1 shows a prior art connected device architecture.
Figure 2A:
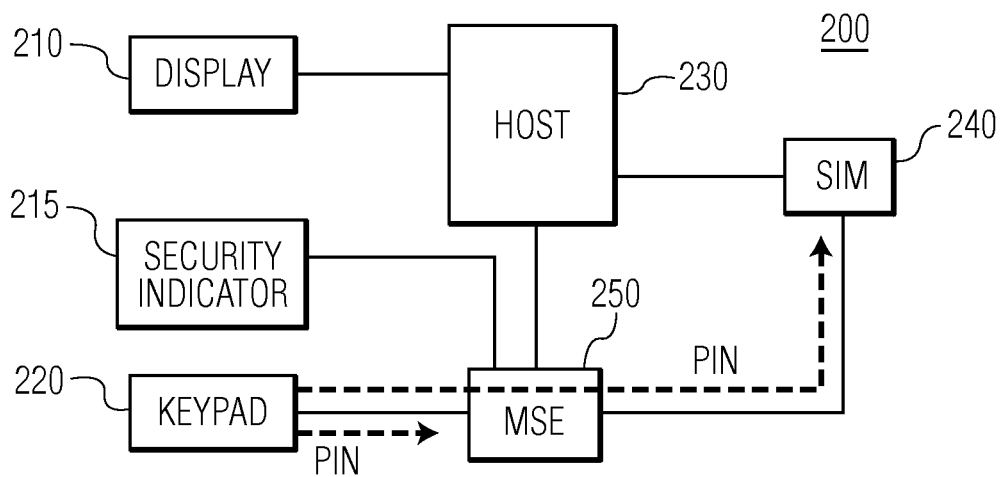
FIG. 2a shows an embodiment in accordance with the invention.

In accordance with the invention, connected device architecture 100 shown in FIG. 1 is modified. In an embodiment in accordance with the invention as shown in FIG. 2a, the connected device architecture 200 gives control of keypad 220 to master secure element (MSE) 250 when a secure input such as a user PIN is requested. When MSE 250 requests a PIN input from the user, keypad 220 is fully controlled by MSE 250. For all non-secure input operations, keypad 220 remains under control of host processor 230. The PIN received by MSE 250 cannot be intercepted by host processor 230. In accordance with the invention, the user is authenticated because only the user knows the PIN and only the user can enter the PIN or other secure input such as a password. The user is typically alerted to the operational state of connected device architecture 200 by security indicator 215 which is directly controlled by MSE 250 to prevent entry of, for example, a PIN in non-secure mode. Security indicator 215 may, for example, be a light emitting diode; or a polarized mask layer or a color filter integrated into display 210, that is activated to inform the user that connected device architecture 200 is operating in secure mode and that keypad 220 is under control of MSE 250 and not host processor 230.

In an embodiment in accordance with the invention as shown in FIG. 2a, the connected device architecture 200 in an embodiment in accordance with the invention can also secure the PIN entry for another secure element, such as SIM card 240. An application running on SIM card 240 only accepts the PIN entry from MSE 250 through the single wire protocol (SWP). MSE 250 becomes a trusted or secure extension of host processor 230 that provides tamper resistant security to all operations related to PIN entry for connected device architecture 200.

Figure 2B:
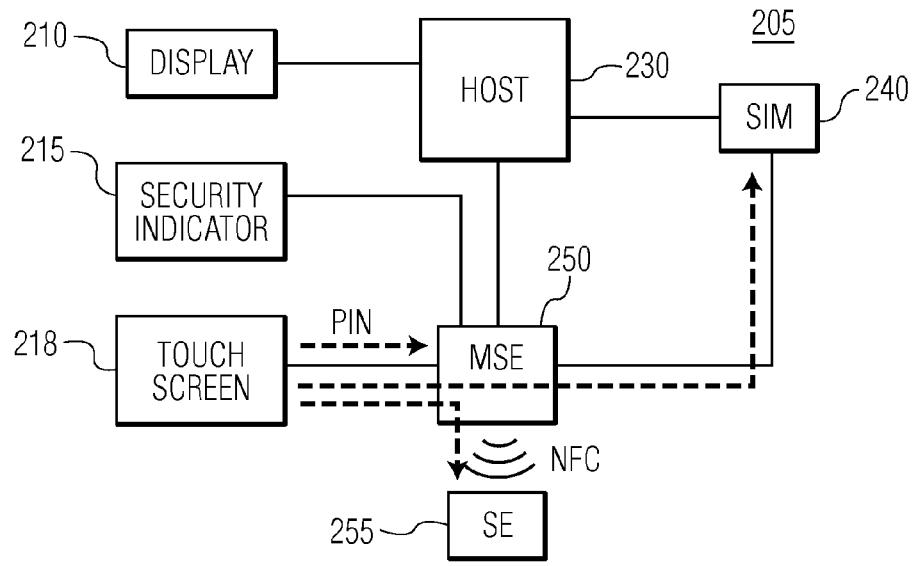
FIG. 2b shows an embodiment in accordance with the invention.

In an embodiment in accordance with the invention as shown in as shown in FIG. 2b, connected device architecture 205 gives control of touch screen 220 to master secure element (MSE) 250 when a secure input such as a user PIN is requested. When MSE 250 requests a PIN input from the user, touch screen 218 is fully controlled by MSE 250. For all non-secure input operations, touch screen 218 remains under control of host processor 230. The PIN received by MSE 250 cannot be intercepted by host processor 230. In accordance with the invention, the user is authenticated because only the user knows the PIN and only the user can enter the PIN or other secure input such as a password. The user is typically alerted to the operational state of connected device architecture 205 by security indicator 215 which is directly controlled by MSE 250 to prevent entry of, for example, a PIN in non-secure mode. Security indicator 215 may, for example, be a light emitting diode; or a polarized mask layer or a color filter integrated into display 210, that is activated to inform the user that connected device architecture 205 is operating in secure mode and that touch screen 218 is under control of MSE 250 and not host processor 230.

With reference to FIG. 2b, the connected device architecture 205 in an embodiment in accordance with the invention can also secure the PIN entry for another secure element, such as SIM card 240. An application running on SIM card 240 only accepts the PIN entry from MSE 250 through the single wire protocol (SWP). MSE 250 becomes a trusted or secure extension of host processor 230 that provides tamper resistant security to all operations related to PIN entry for connected device architecture 205.

Additionally, connected device architecture 205 in FIG. 2b provides communication capability such as, for example, Near Field Communication capability between MSE 250 and external Secure Element (SE) 255. Typically SE 255 may be a contactless smart card with NFC capability or part of another mobile device equipped with NFC capability. MSE 250 provides secure entry via NFC of the PIN into SE 255 and becomes a secure hub for user credentials transferred by external secure elements.

In accordance with the invention, MSE 250 allows embedded secure applications to at least control the user input and the communications interfaces to other secure elements (e.g. SIM card 240). MSE 250 provides a universal secure environment that supports the dematerialization of the security services on mobile devices such as bank cards, mobile wallets, mobile points of sale, virtual SIM, authentication tokens, digital rights management, automatic fare collection etc. Because a PIN code intercepted by malware cannot be introduced into MSE 250, host processor 230 does not need to integrate security features such as process isolation, virtualization, security indicators and the like to protect the PIN entry process. MSE 250 assures that the PIN entered by the user can only originate from keypad 220 or touch screen 218.

Figure 3:
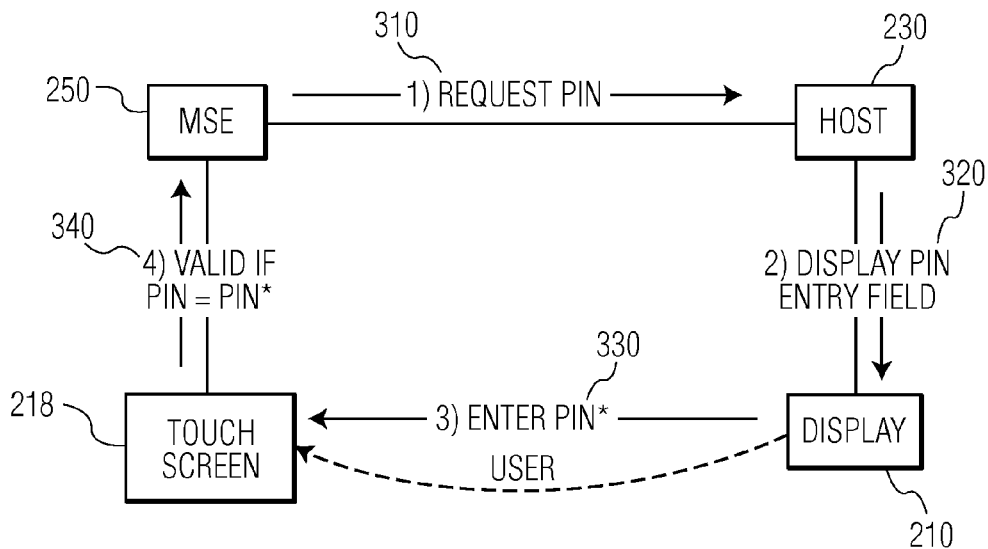
FIG. 3 shows an embodiment in accordance with the invention.
Figure 4:
FIG. 4 shows a prior art alphanumeric keypad.

FIG. 3 shows the secure PIN entry process for an embodiment in accordance with the invention. In step 310, MSE 250 asks host processor 230 to request the user to provide a PIN. In step 320, host processor 230 activates display 210 to display the PIN entry field to the user. In step 330, the user verifies that security indicator 215 is activated and enters the PIN* using touch screen 218 (or keypad 220) which are directly connected to MSE 250. In step 340, MSE 250 compares the PIN securely stored in MSE 250 with the PIN* that was input by the user using keypad 220 or touch screen 218. If PIN is equal to PIN*, the user is authenticated. Note that only the user and MSE 250 have access to the correct PIN. If the PIN* entered by the user and the PIN stored in MSE 250 differ, the user is not authenticated and the transaction is aborted. Note that a numerical PIN may be easily replaced by a password if keypad 220 or touch screen 218 supports letters. Keypad 420 shown in FIG. 4 is an example of a keypad that supports both numbers and letters.

Figure 5A:
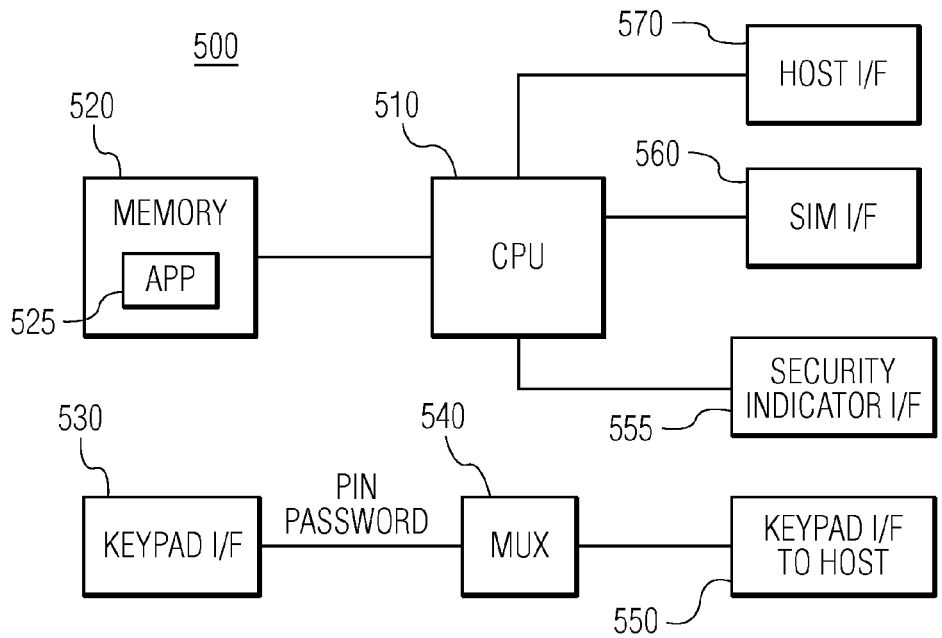
FIG. 5a shows an embodiment in accordance with the invention.

In an embodiment in accordance with the invention, MSE 500 shown in FIG. 5a includes processor (CPU) 510 electrically coupled to memory 520, host interface 570 and SIM interface 560. Host keypad interface 550, keypad interface 530 are electrically coupled to multiplexer (MUX) 540 which is electrically coupled to CPU 510. MUX 540 and security indicator 215 (via security indicator interface 555) are controlled by application 525 running in MSE 250 and stored in memory 520 (see FIGS. 2 and 5). By controlling MUX 540, application 525 stored in memory 520 and running on CPU 510 appropriately redirects user input from keypad interface 530 back to keypad interface to host 550 or to CPU 510 as required.

The master secure element such as MSE 250 may integrate either a full driver for a multi-touch and gesture input or a reduced driver that only supports a single touch input for PIN or password entry operation.

Figure 5B:
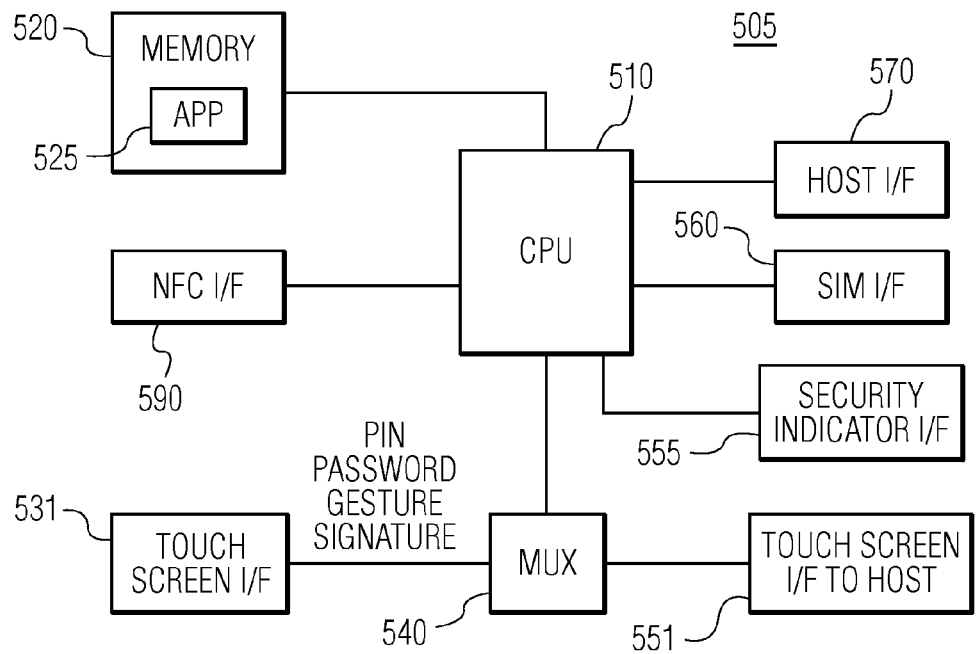
FIG. 5b shows an embodiment in accordance with the invention.

In addition to PIN or password entry, connected device architecture 205 in accordance with the invention shown in FIG. 5b is equipped with touch screen 218 (e.g. such as used in smart phones) instead of keypad 220 to offer the option of using biometric methods to authenticate the user based on finger gestures or a stylus signature, for example. Note that touch screen 218 can function as a virtual keypad and allows PIN and password entry as well.

MSE 505 in an embodiment in accordance with the invention is shown in FIG. 5b and includes processor (CPU) 510 electrically coupled to memory 520, host interface 570 and SIM interface 560. Host touch screen interface 551 and touch screen interface 531 are electrically coupled to multiplexer (MUX) 540 which is electrically coupled to CPU 510. MUX 540 and security indicator 215 (via security indicator interface 555) are controlled by application 525 running in MSE 250 and stored in memory 520 (see FIGS. 2a-b and 5a-b). By controlling MUX 540, application 525 stored in memory 520 and running on CPU 510 appropriately redirects user input from touch screen interface 531 back to touch screen interface to host 551 or to CPU 510 as required. Additionally, NFC interface 590, typically an RF Frontend, is directly connected to CPU 510 of MSE 505. MSE 505 functions as a secure NFC controller.

A fingerprint sensor or other suitable biometric sensor may optionally be embedded in connected device architectures 200 and 205 to authenticate the user. The biometric template provided by the sensor is directly verified within MSE 600 (see FIG. 6).

Figure 6:
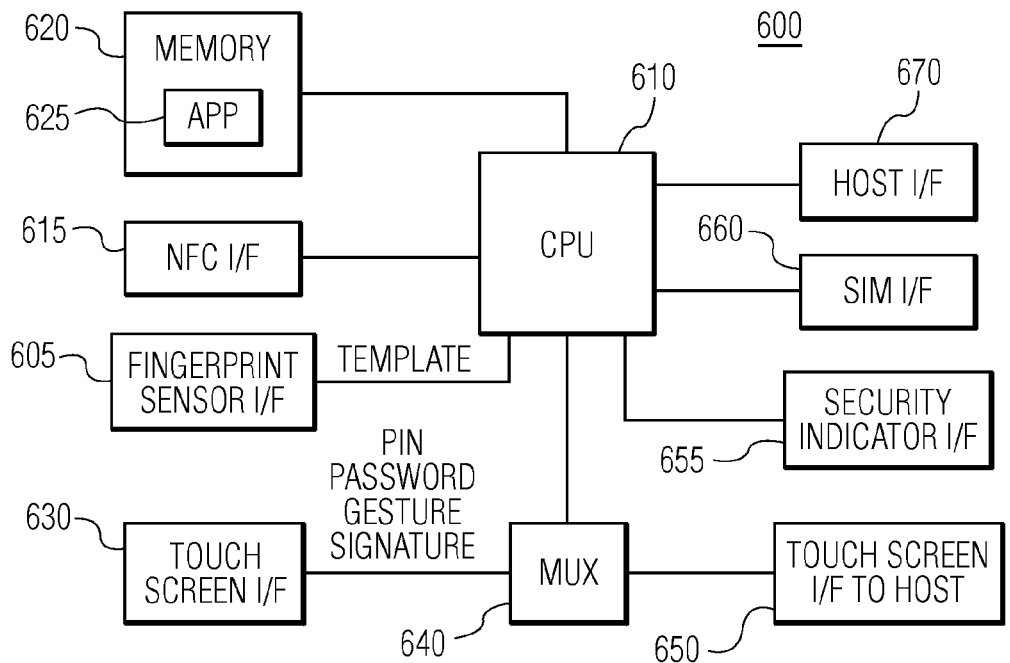
FIG. 6 shows an embodiment in accordance with the invention.

In an embodiment in accordance with the invention shown in FIG. 6, MSE 600 incorporates touch screen interface 630 which is electrically connected to MUX 640. Additionally, touch screen interface to host 650 is electrically connected to MUX 640 which is electrically connected to CPU 610. CPU 610 is also electrically connected to memory 620, host interface 670, NFC interface 615, SIM interface 660 security indicator interface 655 and optional fingerprint sensor interface 605. By controlling MUX 640, application 625 stored in memory 620 and running on CPU 610 appropriately redirects user input from touch screen interface 630 back to touch screen interface to host 650 or to CPU 610 as required. Application 625 also controls security indicator 215 via security indicator interface 655.

Typically, a more powerful CPU 610 is required to handle stylus signatures, finger gestures or fingerprint templates for verification purposes. These inputs as well as a PIN input may be handled in real time by MSE 600 or MSE 500 or encrypted by MSE 600 or MSE 500 and sent to backend server 710 (see FIG. 7) for processing, respectively. These inputs as well as a PIN input may be sent to backend server 710 in real time or stored in memory 620 or memory 520, respectively for later verification by backend server 710, if for example, a data connection to backend 710 is temporarily unavailable.

Figure 7:
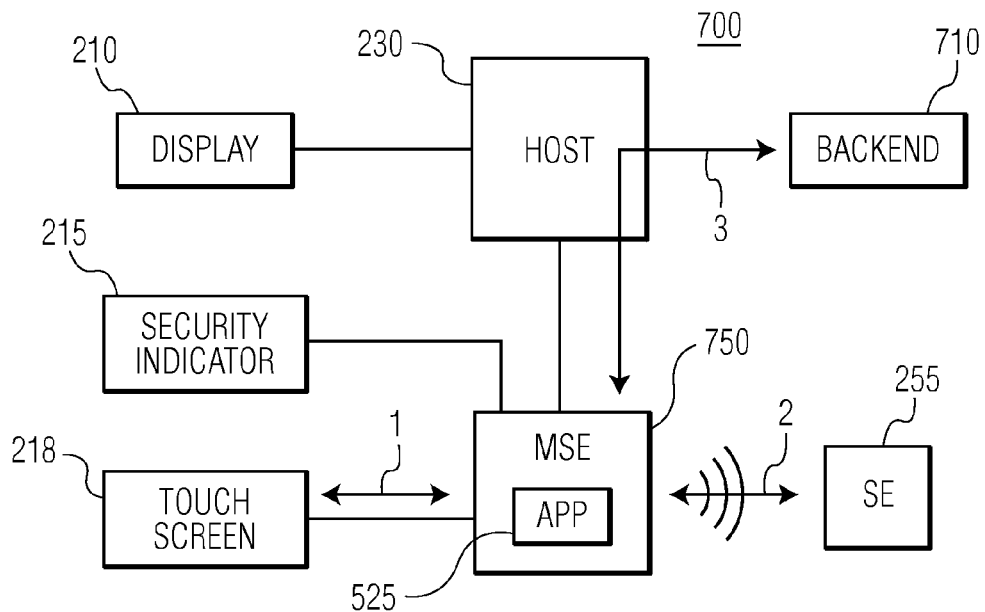
FIG. 7 shows an embodiment in accordance with the invention.

FIG. 7 shows connected architecture 700 with backend server 710 in an embodiment in accordance with the invention. The arrows 1, 2 and 3 represent secure connections. Application 525 is running on MSE 750 which is securely connected to touch screen 218, to backend server 710 and via an NFC connection to secure element 255 such as a smart card or another mobile platform. All security features are handled by MSE 750. Note communication between MSE 750 and backend server 710 is encrypted to provide a secure end to end connection.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A connected device architecture comprising:
   a master secure element including a multiplexer circuit and circuitry configured and arranged to control the multiplexer circuit;
   a host circuit electrically connected to the master secure element via a first electrical pathway; and
   a user input device including circuitry electrically coupled to the master secure element via a second electrical pathway that is separate from the first electrical pathway, the user input device being configured and arranged with the host and master secure element to operate in a secure mode such that a user input to secure user authentication is controlled by the master secure element, and in which the host is prevented from accessing the user input, and to operate in a non-secure mode in which the master secure element couples user inputs received at the user input device to the host circuit.

2. The connected device architecture of claim 1 further comprising:
   a portable device housing including the host, the master secure element and the user input device; and
   a subscriber identity module card within the portable device housing electrically coupled to the host and to the master secure element via circuitry on a circuit board on which the host and master secure element are coupled.

3. The connected device architecture of claim 1 wherein the host includes a computer processor configured and arranged to communicate with the user input device in the non-secure mode which is different than the secure mode, and the master secure element is configured and arranged to, while operating in the secure mode, provide user inputs received via the user input device directly to the master secure element and to prevent the host from accessing the user input.

4. The connected device architecture of claim 1 further comprising a security indicator electrically coupled to the master secure element, and configured and arranged to indicate that the device is operating in the secure mode and that user inputs provided to the user input device are inaccessible by the host.

5. The connected device architecture of claim 1 further comprising a display coupled to the host, and wherein the user input device is a touch screen.

6. The connected device architecture of claim 1 wherein the user input is selected from the group consisting of a personal identification number (PIN) and a password.

7. The connected device architecture of claim 1 further comprising a second user input device electrically coupled to the master secure element.

8. The connected device architecture of claim 7 wherein the second user input device is a fingerprint sensor.

9. The connected device architecture of claim 1 wherein the master secure element comprises:
   a central processing unit (CPU) electrically coupled to a memory and a host interface circuit coupled to the host via the first electrical pathway;
   an interface to the user input device including a keypad interface or a touch screen interface, electrically coupled to the multiplexer circuit; and
   a user input device interface to the host electrically coupled to the multiplexer circuit wherein both the host interface and the user interface to the host are electrically coupled to the host.

10. The connected device architecture of claim 1 wherein the master secure element comprises:
    a central processing unit (CPU);
    a memory electrically coupled to the CPU;
    a host interface electrically coupled to the CPU and to the host;
    an interface to the user input device electrically coupled to the multiplexer circuit and to the user input device; and
    a user input device interface to the host electrically coupled to the multiplexer circuit and to the host.

11. The connected device architecture of claim 10 wherein the master secure element further comprises a fingerprint sensor interface electrically coupled to the CPU.

12. The connected device architecture of claim 11 wherein the fingerprint sensor interface is electrically coupled to a fingerprint sensor.

13. The connected device architecture of claim 10 wherein the master secure element further comprises a subscriber identity module interface electrically coupled to the CPU.

14. The connected device architecture of claim 13 wherein the subscriber identity module interface is electrically coupled to a subscriber identity module card.

15. The connected device architecture of claim 10 wherein the master secure element further comprises a near-field communication (NFC) interface.

16. The connected device architecture of claim 15 wherein the NFC interface functions to allow a direct NFC connection to a contactless smart card.

17. The connected device architecture of claim 1 where the master secure element is securely coupled to a backend server.

18. The connected device architecture of claim 1, wherein the master secure element is configured and arranged to control access to user inputs received at the user input device by the host by preventing the host from accessing the user input in a secure mode, and by coupling signals received from the user input device to the host in another mode.

19. An apparatus comprising:
a user input device including circuitry;
a host computer processor configured and arranged to communicate with and control the user input device in a non-secure mode;
a master secure element including a multiplexer circuit and circuitry configured and arranged to control the multiplexer circuit, the master secure element being electrically coupled to the host and to the user input device via separate electrical pathways, the master secure element being configured and arranged with the host computer processor to operate in a secure mode, which is different from the non-secure mode, by controlling the user input device and accessing user inputs received at the user input device, the host computer processor being prevented from accessing the user inputs while operating in the secure mode; and
a circuit board including a first circuit that connects the user input device to the master secure element, and a second circuit that connects the host computer processor to the master secure element, the second circuit being configured and arranged to provide inputs from the user input device to the host computer processor via the first circuit and the master secure element, under control of the master secure element.

20. The apparatus of claim 19, further including a housing including the host computer processor and the master secure element, and wherein:

the circuitry configured and arranged to control the multiplexer circuit is a central processing unit (CPU) electrically coupled to a memory; and
the master secure element includes:
an interface of the host computer processor;
a touch screen interface electrically coupled to the multiplexer circuit; and
a touch screen interface to the host computer processor electrically coupled to the multiplexer circuit and to the host computer processor.

21. An apparatus comprising:
a user input circuit;
a host; and
a master secure element electrically connected to the user input circuit and to the host via separate electrical pathways, the master secure element including a multiplexer and a central processing unit (CPU), the master secure element being configured and arranged with the host and the user input circuit to
operate in a secure mode in which the master secure element CPU controls the multiplexer to couple user inputs from the user input circuit to the master secure element CPU, and in which the host is prevented from accessing the user inputs, and
operate in another mode in which the master secure element CPU controls the multiplexer to couple inputs from the user input device to the host.

22. The apparatus comprising of claim 21, further including a backend server securely coupled to the master secure element.

* * * * *